(12) United States Patent
Kurahashi et al.

(10) Patent No.: US 6,611,310 B2
(45) Date of Patent: Aug. 26, 2003

(54) LIQUID CRYSTAL DISPLAY DEVICE

(75) Inventors: Nagatoshi Kurahashi, Mobara (JP);
Yoshiaki Nakayoshi, Ooamishirasato (JP); Tohru Sasaki, Mobara (JP);
Kouichi Anno, Mobarai (JP)

(73) Assignee: Hitachi, Ltd., Tokyo (JP)

( * ) Notice: Subject to any disclaimer, the term of this patent is extended or adjusted under 35 U.S.C. 154(b) by 59 days.

(21) Appl. No.: 10/087,791

(22) Filed: Mar. 5, 2002

(65) Prior Publication Data

US 2002/0126241 A1 Sep. 12, 2002

(30) Foreign Application Priority Data

Mar. 7, 2001 (JP) .......................... 2001-063494

(51) Int. Cl.⁷ ............................................. G02F 1/1343
(52) U.S. Cl. ..................... 349/141; 349/42; 349/146; 349/138; 349/143
(58) Field of Search .......................... 349/138, 42, 141, 349/43

(56) References Cited

U.S. PATENT DOCUMENTS 6,091,473 A * 7/2000 Hebiguchi ................. 349/141
6,392,730 B2 * 5/2002 Ohta et al. ................. 349/139
6,411,357 B1 * 6/2002 Ting et al. ................. 349/141

* cited by examiner

Primary Examiner—James Dudek
Assistant Examiner—Thoi V Duong

(57) ABSTRACT

To obtain a liquid crystal display device excellent in reliability without employing any special arrangements. In each pixel region on the liquid crystal side of one substrate of respective substrates which are disposed opposite to each other with a layer of liquid crystals interposed therebetween, one electrode and an insulating film plus a remaining electrode are formed so that these are laminated or multi-layered from the one substrate side, the one substrate is formed as an arrangement that can also do double-duty as a reflection film, whereas the other electrode is formed of a plurality of electrodes which extend in one direction within the formation region of the one electrode and are parallel-provided in a specified direction that crosses or intersects the one direction.

15 Claims, 13 Drawing Sheets

LIQUID CRYSTAL DISPLAY DEVICE

BACKGROUND OF THE INVENTION

1. Field of the Invention

The present invention relates to liquid crystal display devices and in particular, to a liquid crystal display device of the so-called reflection type.

2. Description of the Related Art

A liquid crystal display device is arranged so that a pair of substrates being disposed opposite to each other with layer of liquid crystals interposed between them are for use as an outer housing while comprising a liquid crystal display unit that is made up from a great number of picture elements or "pixels" in spreading directions of the liquid crystal layer.

Liquid crystals of each pixel are arranged to be controlled in optical transmissivity by the strength or intensity of an electrical field as applied thereto.

In addition, a liquid crystal display device of the so-called reflection type is designed to comprise a reflective film with increased light reflection efficiency, which is on the liquid crystal side surface of one substrate of the respective substrates at an entirety of at least a pixel region (or alternatively at pat of it: in this case, called the partial reflection type in some cases). In this case, this reflective film is ordinarily arranged to constitute one electrode upon application of electric fields to the liquid crystals.

Images at the liquid crystal display unit can be recognized by observing light rays being reflected off from the reflective film through the liquid crystals of each pixel when external attendant light falls onto the liquid crystal display unit of the liquid crystal display device.

SUMMARY OF THE INVENTION

However, in the liquid crystal display device arranged in the way stated above, it will be desirable that the reflective film be designed in such a way that a convexo-concave configuration is formed on its surface to thereby disperse the illumination direction of reflected light for a certain degree.

The reason for this is that in the case of a reflective film with flat surface, when an observer observes the liquid crystal display unit, the observer's face or his or her background scenes will possibly be clearly "mirrored" therein from time to time.

However, processing or machining the reflective film in the way noted above would result in an increase in mass-production process steps, which leads to establishment of another technical approach.

One invention was made in view of the above-mentioned technical background, and one object of this application is to provide a liquid crystal display device excellent in reliability for use as the reflection type without any need to employ any neither "special" arrangement nor configuration.

A brief explanation of the summary of a representative one of those inventions as disclosed herein is as follows.

A liquid crystal display device in accordance with the invention is featured, for example, in that in each pixel region on the liquid crystal side of one substrate of respective substrates as disposed opposite to each other with a layer of liquid crystals being interposed therebetween, one electrode and an insulating film plus a remaining electrode are stacked over one another from the one substrate side, wherein the one electrode is formed as an arrangement which also serves as a reflective film whereas the remaining electrode is formed of a plurality of electrodes extending in one direction within a formation region of the one electrode and being parallel-provided in a direction crossing the one direction.

The liquid crystal display device thus arranged is such that an upper layer with its underlying insulating film of one electrode also functioning as a reflective film is expected to be formed as a surface plane with a convexo-concave configuration formed thereon by the other electrode.

Due to this, externally incoming light behaves to fall onto the reflective film through the liquid crystals, resulting in reflected light at this reflective film being dispersed or scattered by the presence of the convexo-concave configuration.

Consequently, it is possible to obtain the intended liquid crystal display device of excellent reliability for use as the reflection type, without having to employ any special arrangements.

DETAILED DESCRIPTION

Several preferred embodiments of the liquid crystal display device incorporating the principles of the invention will now be explained with reference to the accompanying drawings below.

Embodiment 1

Equivalent Circuitry

Figure 2:
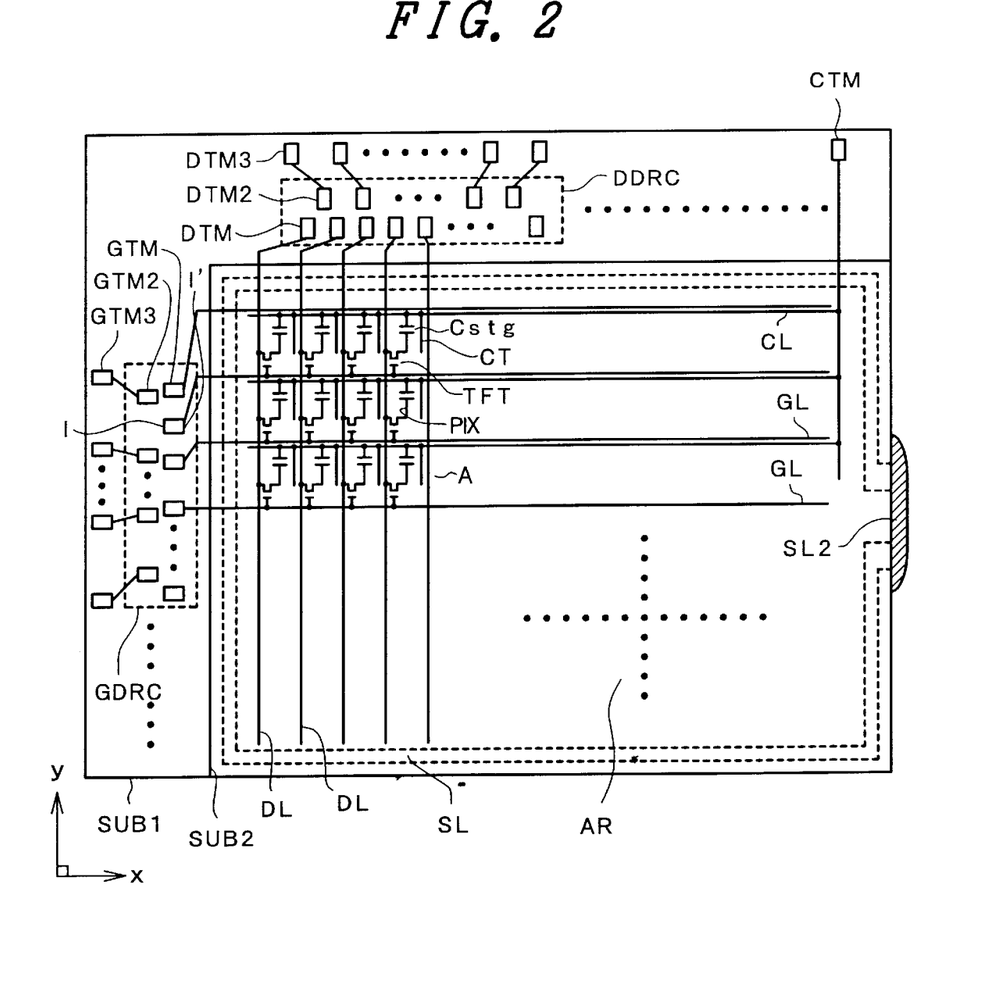
FIG. 2 is an entire equivalent circuit diagram showing one embodiment of the liquid crystal display device in accordance with the invention.

FIG. 2 is a diagram showing an equivalent circuit of a liquid crystal display device embodying the invention.

While the same drawing is one equivalent circuit, but this is a diagram corresponding to a real geometrical layout.

In FIG. 2, there is a transparent substrate SUB1, wherein this transparent substrate SUB1 is disposed to oppose a remaining transparent substrate SUB2 with a layer of liquid crystals being sandwiched therebetween.

Formed on the liquid crystal side surface of the transparent substrate SUB1 are gate signal lines GL that extend in an "x" direction and are parallel-provided in a "y" direction in the drawing and also drain signal lines DL which are insulated from these gate signal lines GL and extend in the y direction while being parallel-provided in the x direction, wherein rectangular regions surrounded by these respective signal lines become pixel regions, and wherein an ensemble of these respective pixel regions is designed to make up a display unit AR.

In addition, counter voltage signal lines CL are formed between respective gate signal lines GL in such a manner that these lines CL are disposed in parallel with the gate signal lines GL. These respective counter voltage signal lines CL are arranged so that a signal (voltage) for use as a reference with respect to an image signal or signals as will be described later is supplied thereto while being connected in each pixel region to a counter electrode CT to be later described.

In each pixel region, there are formed a thin-film transistor TFT that is driven by supplement of a scan signal (Voltage) from one gate signal line GL and a pixel electrode PIX to which an image signal (voltage) from one drain signal line DL is to be supplied through this thin-film transistor TFT.

Additionally a capacitive element Cstg is formed between a pixel electrode PIX and counter voltage signal line CL, wherein this capacitive element Cstg permits an image signal as has been supplied to the pixel electrode PIX to be long stored when the thin-film transistor TFT turns off.

The pixel electrode PIX in each pixel region is arranged to generate between this pixel electrode PIX and its neighboring counter electrode CT an electric field which has almost parallel components to the transparent substrate SUB1, to thereby control the optical transmissivity of liquid crystals of a corresponding pixel region.

Each gate signal line GL has one terminate end which is extended up to one edge side (left side in FIG. 2) of the transparent substrate, wherein its extension portion is such that a terminal section GTM is formed to be connected to a bump of a semiconductor integrated circuit GDRC consisting essentially of a vertical scanning circuit as mounted on the transparent substrate SUB1; in addition, each drain signal line DL also has one end that is extended up to one edge side (upper side in FIG. 2) of the transparent substrate SUB1, wherein its extension portion is such that a terminal section DTM is formed and connected to a bump of a semiconductor integrated circuit DDRC consisting essentially of an image signal drive circuit as mounted on the transparent substrate SUB1.

The semiconductor integrated circuits GDRC, DDRC are such that these themselves are completely mounted on the transparent substrate SUB1 respectively—this is called the chip-on-glass (COG) scheme.

Respective bumps on the input side of the semiconductor integrated circuits GDRC, DDRC also are connected to terminal sections GTM2, DTM2 as formed at the transparent substrate SUB1 respectively, wherein these respective terminal sections GTM2, DTM2 are arranged to be connected through each wiring layer to terminal sections GTM3, DTM3 which are laid out respectively at portions of the periphery of the transparent substrate SUB1 nearest to the edge face.

In addition, each counter voltage signal line CL has its one end (right side) which is commonly coupled together with those of the remaining counter voltage signal lines CL, wherein these are extended up to the edge side of the transparent substrate SUB1 for connection to a terminal section CTM.

The transparent substrate SUB2 is disposed to oppose the transparent substrate SUB1 in such a manner as to avoid any regions in which the semiconductor integrated circuits are mounted and has its area smaller than that of the transparent substrate SUB1.

And, rigid attachment or fixation of the transparent substrate SUB2 with respect to the transparent substrate SUB1 is done by a seal material SL which is formed at the periphery of the transparent substrate SUB2, wherein this seal material SL functions also to seal the liquid crystals between the transparent substrates SUB1, SUB2.

It should be noted that although in the above explanation one specific liquid crystal display device using the COG scheme was discussed, the invention are also applicable to those of the type using TCP scheme. Note here that the TCP scheme as used herein is to be understood to mean the one with semiconductor integrated circuits being formed by tape carrier schemes, wherein output terminals thereof are connected to terminal sections as formed on the transparent substrate SUB1 whereas input terminals are connected to terminal sections on a printed circuit board which is disposed adjacent to the transparent substrate SUB1.

Also note that while the liquid crystal display device with the above-stated arrangement is for use as the one of either the desktop type or the laptop type, the invention may also be applied to liquid crystal display devices of portable or "mobile" wireless telephone handsets.

Pixel Arrangement

Figure 1:
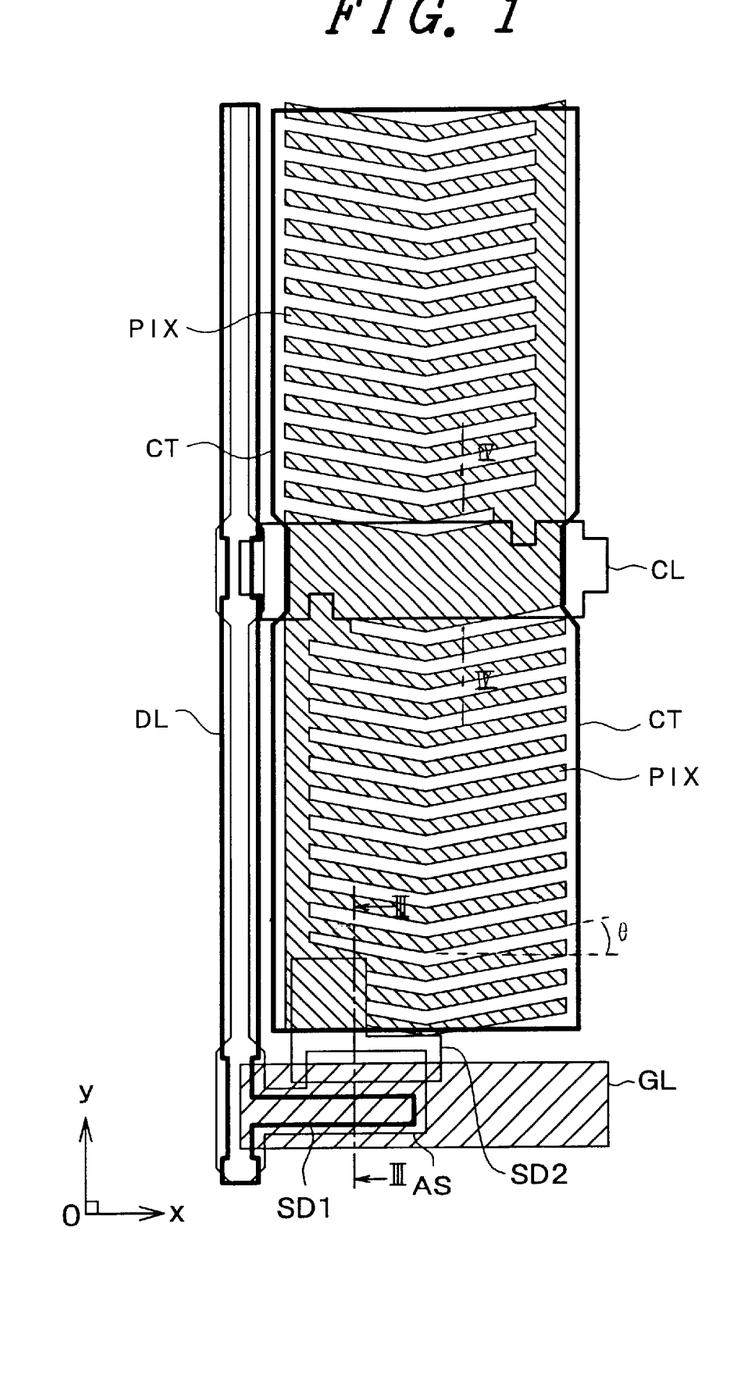
FIG. 1 is a plan view diagram showing one embodiment of a pixel of a liquid crystal display device in accordance with the invention.
Figure 3:
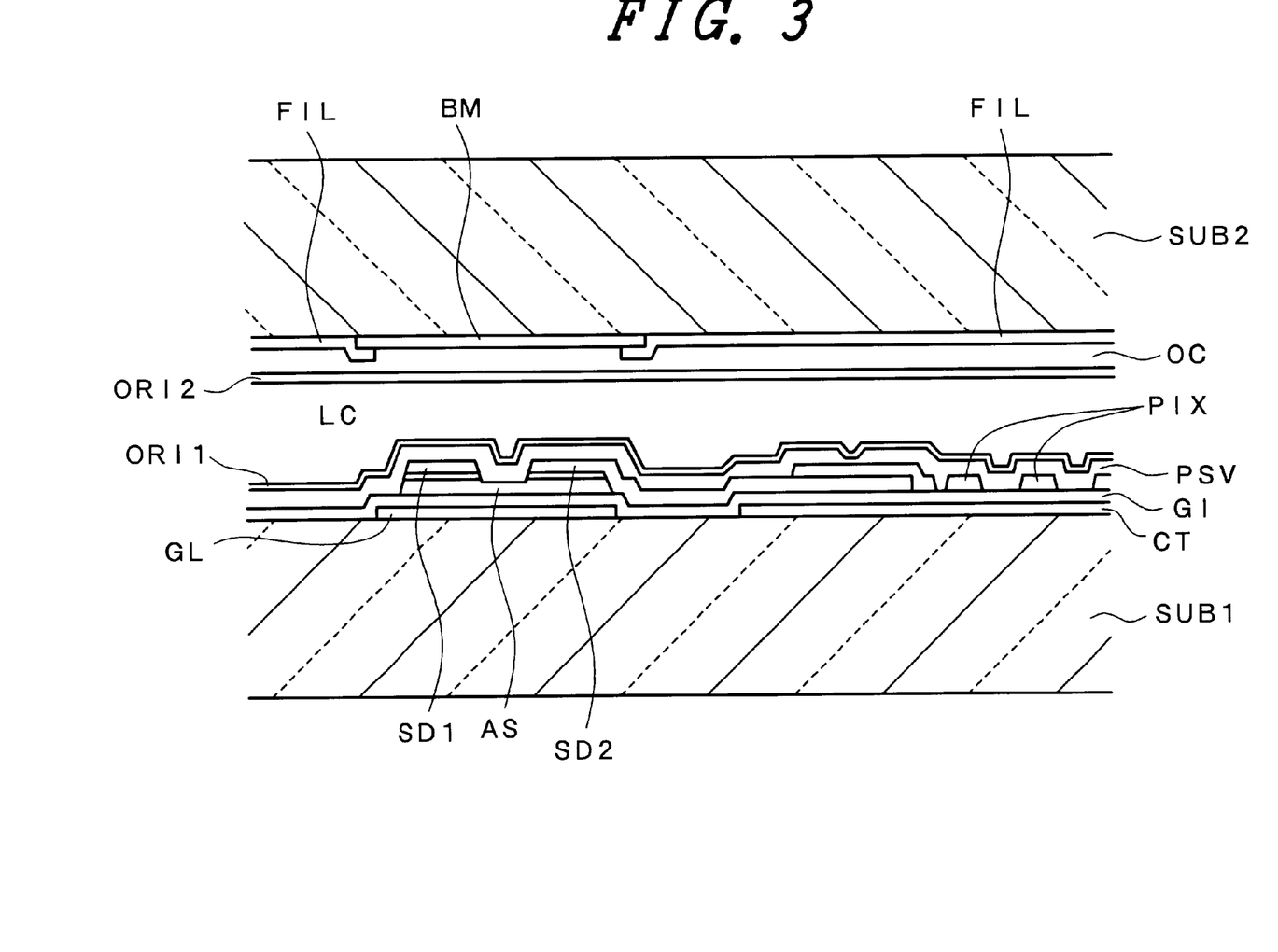
FIG. 3 is a cross-sectional diagram along line III—III of FIG. 1.
Figure 4:
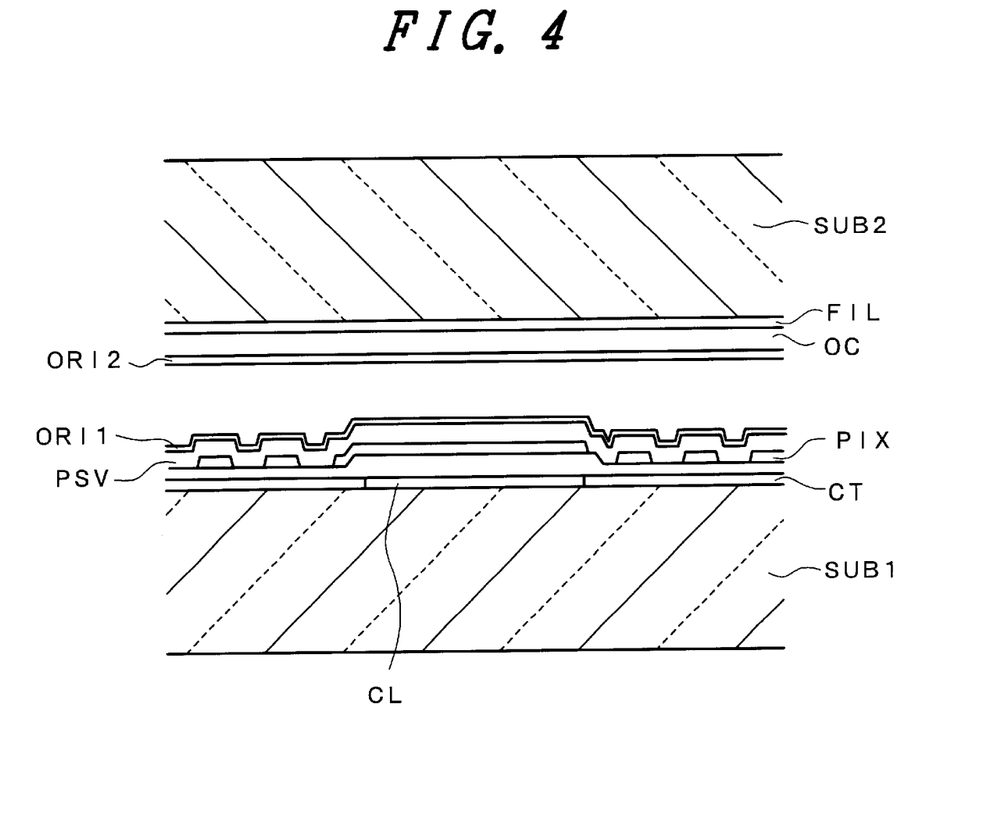
FIG. 4 is a sectional diagram along line IV—IV of FIG. 1.

FIG. 1 is a plan view diagram showing one embodiment of a pixel of the liquid crystal display device described above. Additionally its cross-sectional diagram as taken along line III—III is shown in FIG. 3 whereas a sectional diagram along line IV—IV is shown in FIG. 4.

First of all, a gate signal line GL extending in the x direction in FIG. 1 is formed on the lower side of a pixel region on the surface of the transparent substrate SUB1. This gate signal line GL is comprised of Al or its alloys, by way of example.

This gate signal line GL is formed so that it surrounds the pixel region along with a corresponding gate signal line (not shown) of a pixel region as located at an upper side position of the pixel region and a drain signal line DL to be later described plus a corresponding drain signal line (not shown) of a pixel region as located at a position on the right side of the pixel region.

In addition, a counter voltage signal line CL that runs in parallel with the each gate signal line GL is formed between respective neighboring gate signal lines GL. This counter voltage signal line CL is formed for example at the same time during formation of gate signal lines GL and is made of Al or its alloys by way of example.

Additionally a counter electrode CT is formed on the upper surface of the transparent substrate SUB1 in such a manner as to be electrically connected with the counter voltage signal line CL while avoiding the formation region of the gate signal line GL to thereby cover the most part of the pixel region.

This counter electrode CT is the one that permits creation of an electric field between itself and a pixel electrode PIX as will be later described, which is designed so that it can also do double-duty as a reflective film.

Due to this, this counter electrode CT is made of a carefully chosen material which is excellent in reflectivity of light; for example, Al or other similar suitable materials.

On the surface of the transparent substrate SUB1 with the gate signal line GL and counter voltage signal line CL plus counter electrode CT formed thereon in this way, an insulating film GI made for example of SiN or else is formed to cover these gate signal lines GL and others (refer to FIG. 3 and FIG. 4).

This insulating film GI is designed to have with respect to the gate signal line GL and counter voltage signal line CL a function as an interlayer insulating film relative to a drain signal line(s) DL to be later described, and have with respect to a later-described thin-film transistor TFT a function as the gate insulating film thereof, and further have with respect to a later-described capacitive element Cstg a function as its insulating film.

And formed at a portion overlapping the gate signal line GL at the upper surface of the insulating film GI is a semiconductor layer AS made for example of amorphous Si (a-Si).

This semiconductor layer AS becomes a semiconductor layer of the thin-film transistor TFT and is designed so that forming on this upper surface both a drain electrode SD1 and a source electrode SD2 results in formation of a MIS transistor of reversed stagger structure with part of the gate signal line GL being used as a gate electrode.

It must be noted that this semiconductor layer AS is formed not only in the formation region of the thin-film transistor TFT but also in the formation region of a drain signal line DL to be later described. This is in order to let the insulating film GI have the function as an interlayer insulating film of the drain signal line DL with respect to the gate signal line GL and counter voltage signal line CL.

The drain electrode SD1 of the thin-film transistor TFT is designed to be formed simultaneously during formation of the drain signal line DL: in this event, the source electrode SD2 is to be formed in such a manner as to have a distance equivalent to the drain electrode SD1 and the channel length of thin-film transistor TFT.

More specifically, a drain signal line DL extending in the y direction in FIG. 1 is formed on the insulating film GI—when this is done, its part is caused to extend up to an upper face of the semiconductor layer AS whereby the drain electrode SD1 is thus formed. These drain signal line DL and drain electrode SD1 are formed for example of Cr or its alloys.

Additionally the source electrode SD2 to be formed in this event is caused to extend in such a way as to extrude the formation region of the semiconductor layer AS, wherein this extension portion becomes a contact portion for connection with a pixel electrode PIX as will be described later.

And formed on a surface of the insulating film GI within the pixel region is a plurality of pixel electrodes PIX structured from a strip or band-shaped pattern extending in the x direction in FIG. 1 and being parallel-provided in the y direction in FIG. 1.

For instance, these respective pixel electrodes PIX are electrically connected together at right side ends in FIG. 1 within an upper region of the counter voltage signal line CL and also at the left side ends in FIG. 1 within a lower region, wherein part thereof is designed to overlap the extension portion of the source electrode SD2 and is electrically connected to the source electrode SD2.

Note here that this pixel electrode PIX is such that a capacitive element Cstg with the insulating film GI being as its insulating film is formed at a portion overlapping the counter voltage signal line CL and the counter electrode CT.

Also note that each pixel electrode PIX extending into the x direction in FIG. 1 has a single curved or bent portion at its almost central portion for example, which becomes a pattern of the so-called inverse Japanese hiragana character "he"-like shape.

This is such that letting in each region of the right half and left half of the pixel region in FIG. 1 the pixel electrode have angles of $\theta$, $(180°-\theta)$ with respect to the running direction of gate signal line GL respectively by way of example makes electric fields to be created in respective regions different in direction from each other.

This arrangement discussed above is called the multi-domain scheme, which is designed to avoid occurrence of unwanted changes in color tone due to angles when an observer observes the liquid crystal display unit.

Form this concept, it would readily occur to those skilled in the art to which the invention pertains that this pixel electrode PIX may be designed so that it does not employ the arrangement such as shown in FIG. 1 and may alternatively be arranged to extend in the y direction in FIG. 1 and thus fabricated to form several bent portions along the extension direction thereof, as an example.

The pixel electrode PIX to which a video or image signal was supplied from a drain signal line DL via a thin-film transistor TFT permits creation of electric fields between it and the counter electrode CT (to which a voltage for use as a reference relative to the image signal is to be applied), wherein the electric fields include an electric field having components in nearly parallel with the transparent substrate SUB1, which is used to control the optical transmissivity of liquid crystal material LC.

Additionally, while this pixel electrode PIX may be formed of opaque material such as metals, letting it be formed of optical transmittable or translucent material such as for example an indium-tin-oxide (ITO) film makes it possible to offer an effect as to improvements in aperture ratios of pixels involved.

On the surface of the transparent substrate SUB1 with the thin-film transistor TFT and drain signal line DL plus pixel electrode PIX formed thereon in this way, a protective film PSV made for example of SiN or the like is formed in such a manner as to cover the thin-film transistor TFT and the like also (see FIGS. 3 and 4). This protective film PSV is formed principally in order to avoid any direct contact of the thin-film transistor TFT with the liquid crystal LC to thereby preclude degradation of the characteristics of such thin-film transistor TFT.

And an orientation film ORI2 is formed on a surface of this protective film PSV in such a manner that the initial orientation or "alignment" directions of molecules of the liquid crystal LC are forced to align with the rubbing direction as formed on the surface thereof.

Additionally formed on the liquid crystal side surface of the transparent substrate SUB2 being disposed to oppose the transparent substrate SUB1 thus arranged in the way discussed above with the liquid crystal material LC sandwiched between them is a black matrix BM in such a way as to define or partition respective pixel regions.

This black matrix BM is formed in order to improve the contrast of on-screen display images and also to avoid irradiation of external incident light rays to thin-film transistors TFT.

Formed on the surface of transparent substrate SUB2 with the black matrix BM formed thereon in this way is a color filter FIL of common color to respective pixel regions which are parallel-provided in the y direction with sequential layout of red (R) and green (G) plus blue (B) in the x direction.

And a planarized film OC which is comprised for example of a resin film is formed to cover or coat these black matrix BM and color filter FIL also, with an orientation film ORI2 being formed on a surface of this planarized film OC. This orientation film ORI2 has its rubbing direction which is the same as that of the orientation film on the transparent substrate SUB1 side.

The liquid crystal display device thus arranged is such that a great number of pixel electrodes PIX are formed and parallel-provided in the pixel regions thereof. Due to this, the upper surface of the insulating film GI is formed with a convexo-concave configuration owing to the presence of the pixel electrodes PIX while at the same time letting this convexo-concave configuration be made appreciable also at the surface of the protective film PSV covering these pixel electrodes PIX.

This permits light rays as reflected due to irradiation of externally incoming light to be sufficiently dispersed or scattered by the convexo-concave configuration.

In this case, in cases where the pixel electrodes PIX are formed using translucent material such as an ITO film, it is possible to make their distances narrower without worrying about any possible reduction of the aperture ratios of the pixels to thereby increase the convexo-concave configuration, which in turn makes it possible to enlarge or "accelerate" the dispersion effect of reflection light.

And it has been affirmed that irrespective of whether the pixel electrodes PIX are made of translucent or opaque material, in the relationship of spaced-apart distance between the electrode width thereof and neighboring other pixel electrodes PIX (i.e. distance between electrodes), designing the interelectrode distance to be ½ to 2 times with respect to the electrode width makes it possible to sufficiently increase the reflection light dispersion or scattering without reducing the pixel aperture ratios.

Embodiment 2

Figure 5:
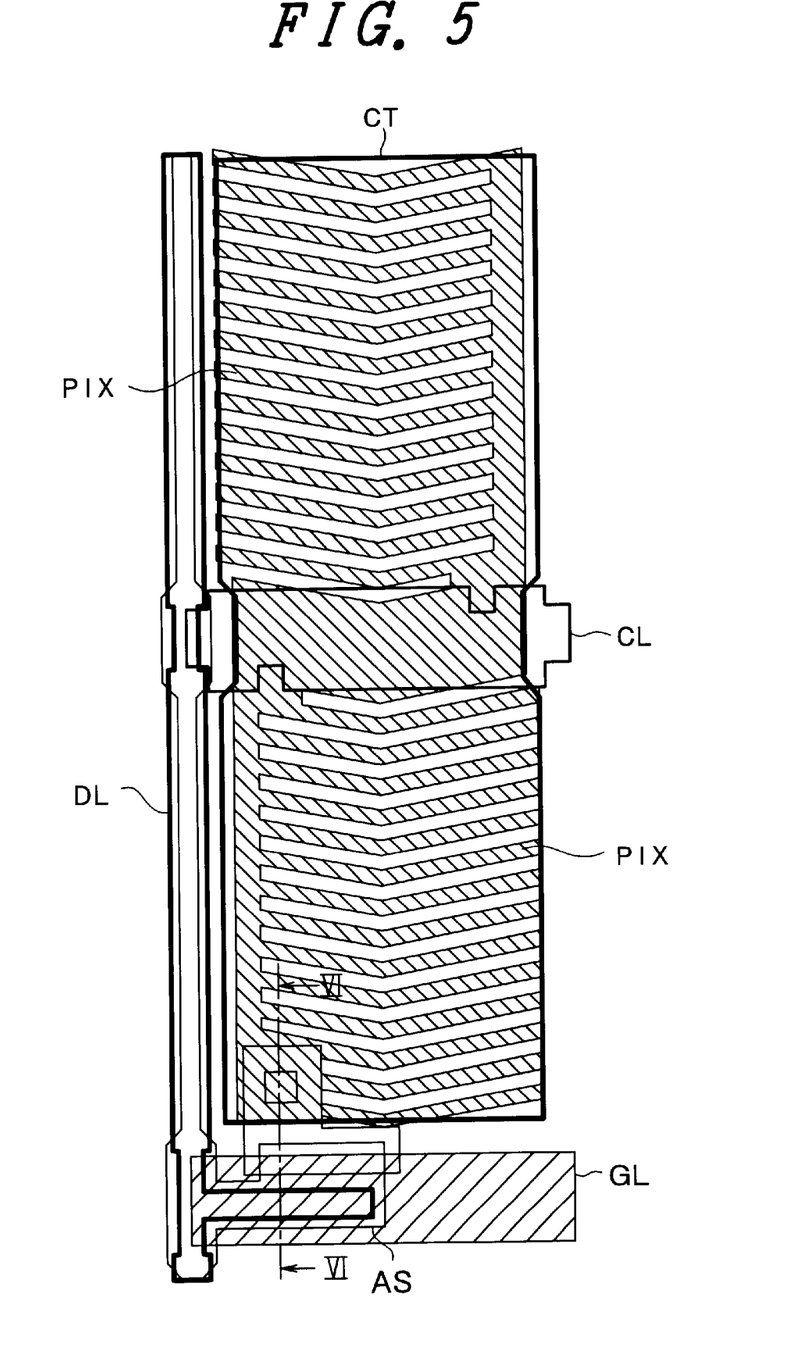
FIG. 5 is a plan view diagram showing another embodiment of the pixel of the liquid crystal display device in accordance with the invention.
Figure 6:
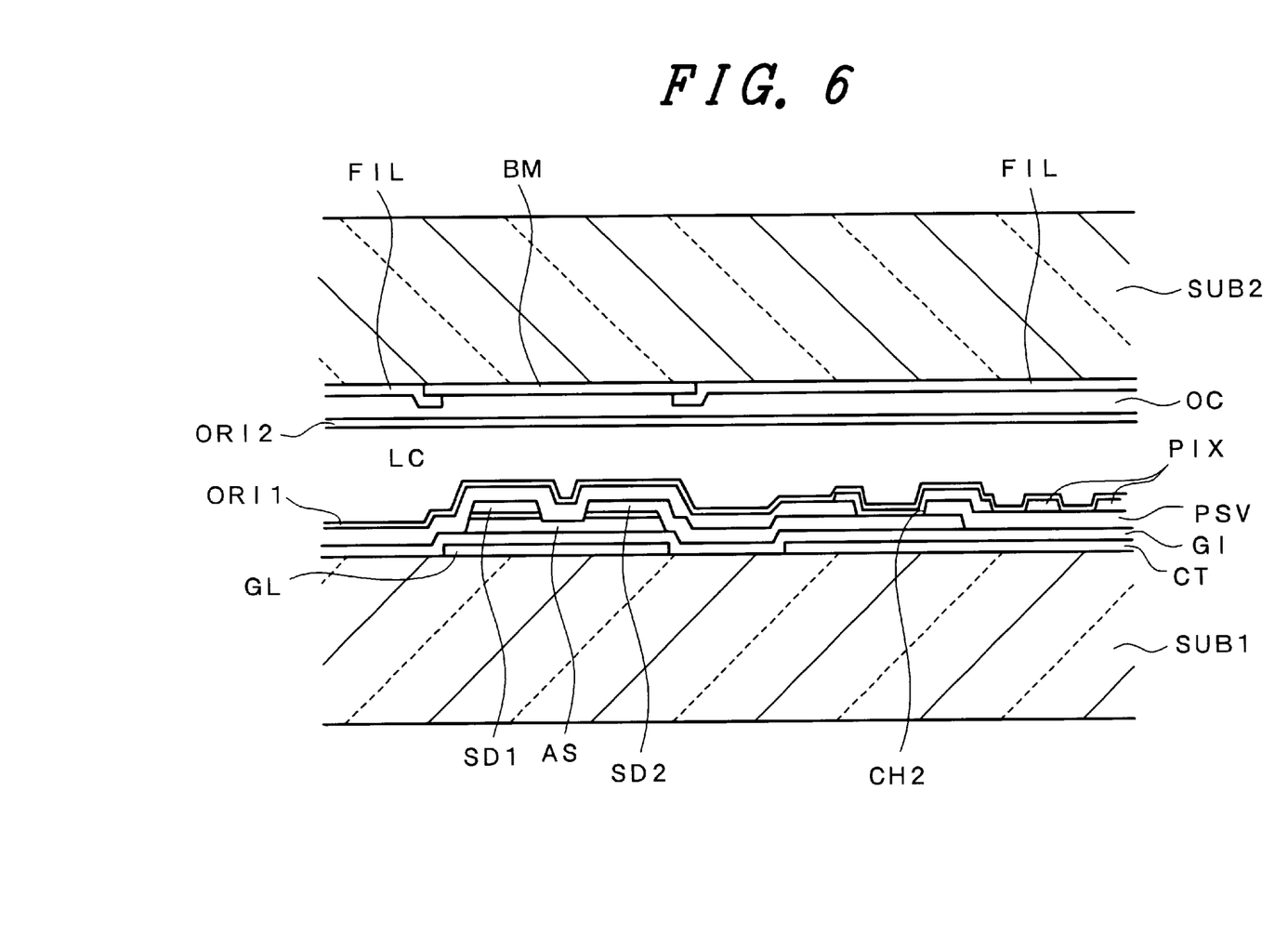
FIG. 6 is a sectional diagram along line VI—VI of FIG. 5.

FIG. 5 is a plan view diagram showing another embodiment of the liquid crystal display device in accordance with the invention, which drawing is the one that corresponds to FIG. 1. In addition, FIG. 6 is a sectional diagram along line VI—VI of FIG. 5.

A difference in arrangement from the case of FIG. 1 is that the protective film PSV is formed at the upper surface of an insulating film GI with the pixel electrode PIX formed on the upper face of such protective film PSV.

With such an arrangement, the pixel electrode PIX is electrically connected to the source electrode SD2 of a thin-film transistor TFT being formed on the insulating film GI through a contact hole CH2 as formed in the protective film PSV.

The liquid crystal display device arranged in this way is such that a convexo-concave configuration owing to the presence of the pixel electrodes PIX is formed on the surface of the protective film PSV within the pixel region thereof in a similar way to the case of FIG. 1; thus, it is possible by this convexo-concave configuration to disperse or scatter reflection light from the counter electrode for use as a reflective film.

Embodiment 3

Figure 7:
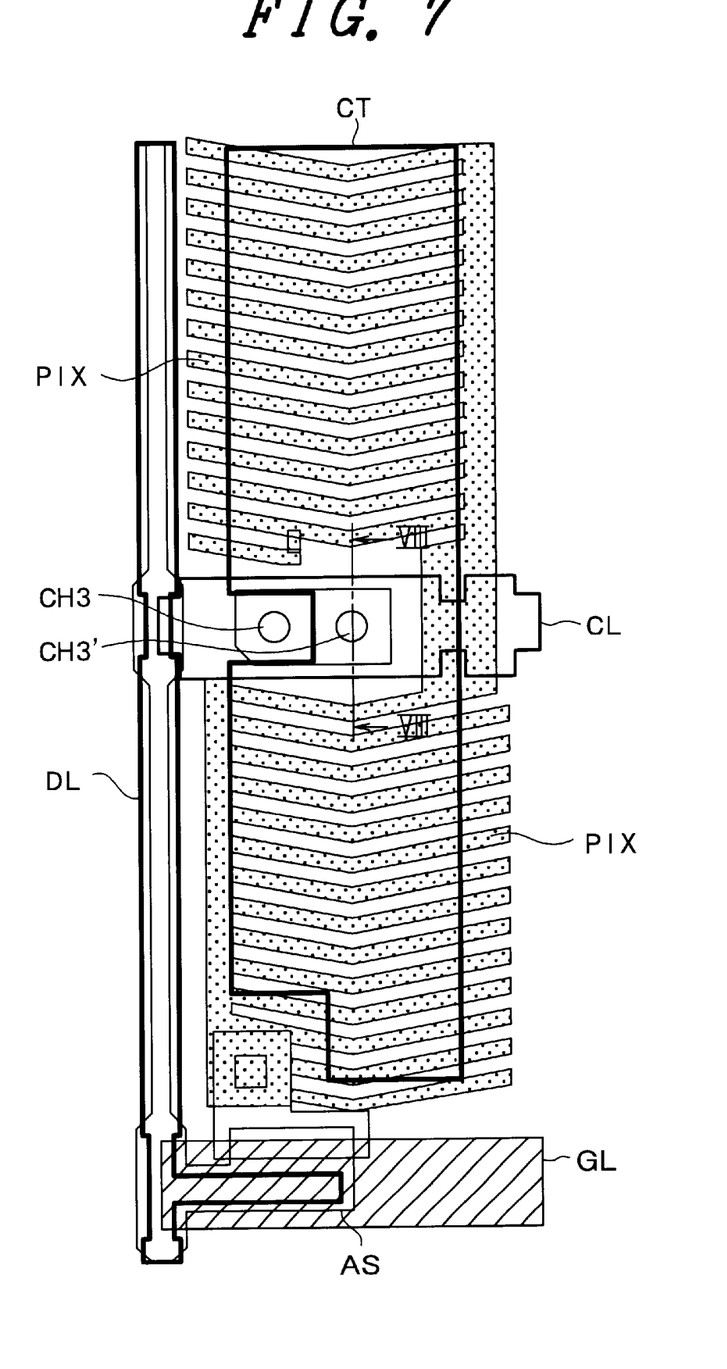
FIG. 7 is a plan view diagram showing still another embodiment of the pixel of the liquid crystal display device in accordance with the invention.
Figure 8:
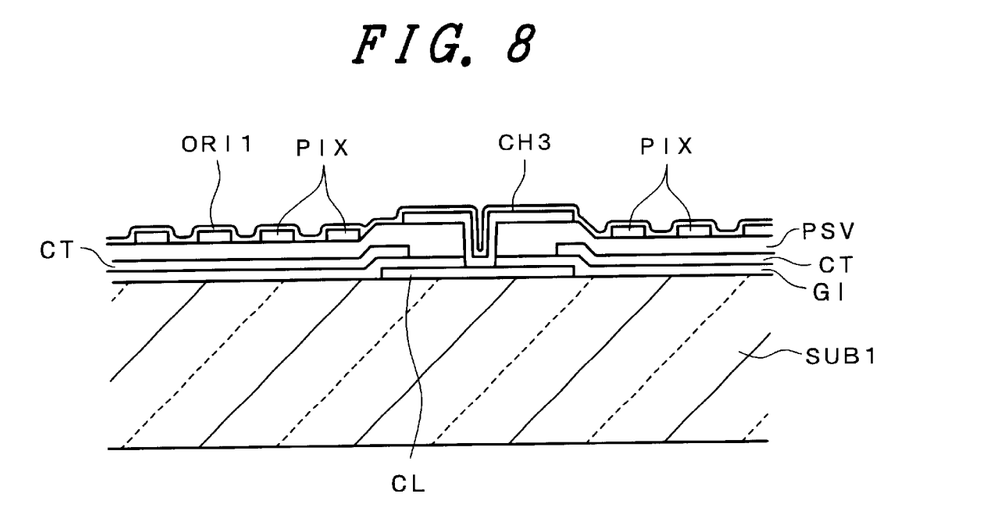
FIG. 8 is a sectional diagram along line VIII—VIII of FIG. 7.

FIG. 7 is a plan view diagram showing yet another embodiment of the liquid crystal display device in accordance with the instant invention, which becomes a diagram corresponding to FIG. 5. Additionally FIG. 8 is a sectional diagram along line VIII—VIII of FIG. 7 (the arrangement on the transparent substrate SUB2 side is not depicted herein).

A different in arrangement from the case of FIG. 5 lies in that the counter electrode CT serving as a reflective film is formed on the upper surface of insulating film GI with the protective film PSV formed on the upper face of counter electrode CT.

With such an arrangement, the counter electrode CT is electrically connected to the counter voltage signal line CL being formed beneath the insulating film GI through a contact hole CH3 as formed to penetrate both the protective film PSV and the insulating film GI and also a contact hole CH3' as formed in the protective film PSV.

The liquid crystal display device arranged in this way also is such that a convexo-concave configuration owing to the pixel electrodes PIX is formed on the surface of the protective film PSV within the pixel region thereof; thus, it is possible by this convexo-concave configuration to successfully disperse or scatter reflection light from the counter electrode for use as a reflective film.

Embodiment 4

Figure 9:
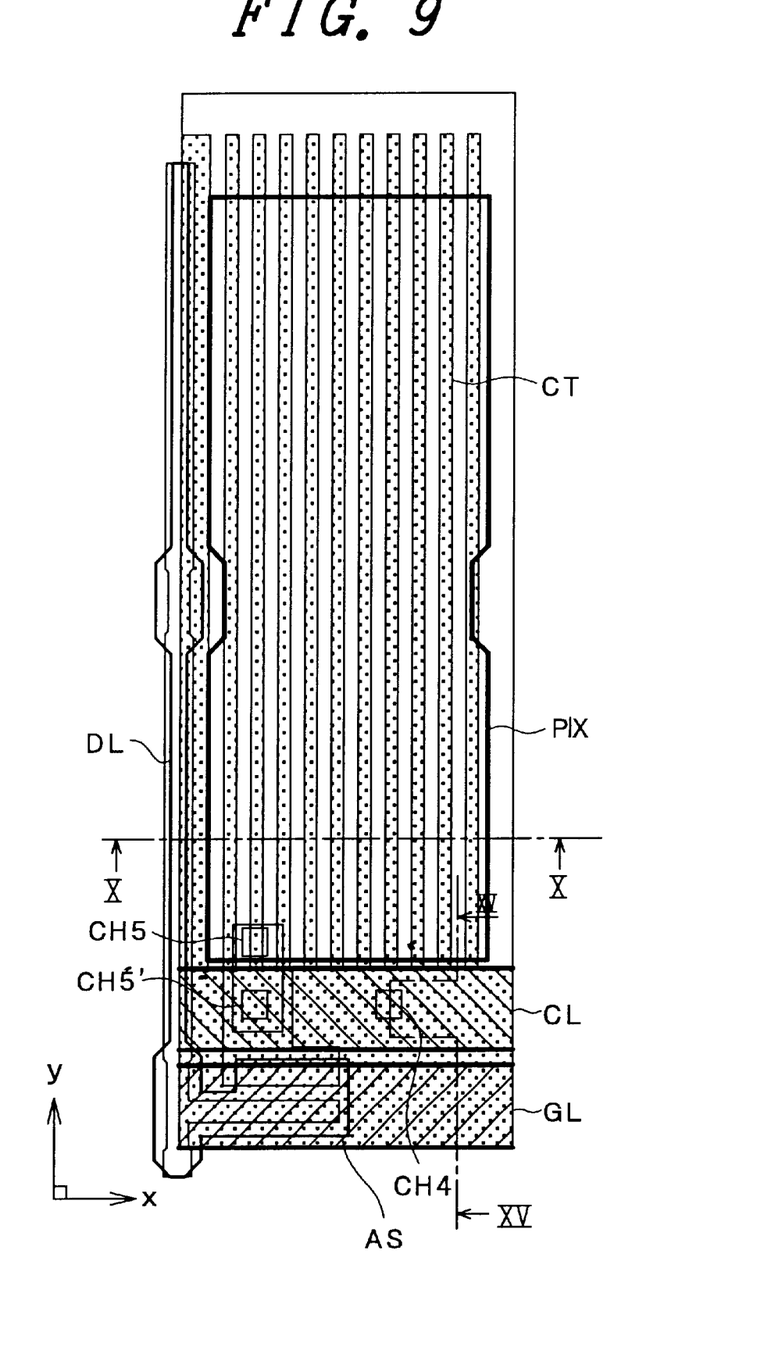
FIG. 9 is a plan view diagram showing yet another embodiment of the pixel of the liquid crystal display device in accordance with the invention.
Figure 15:
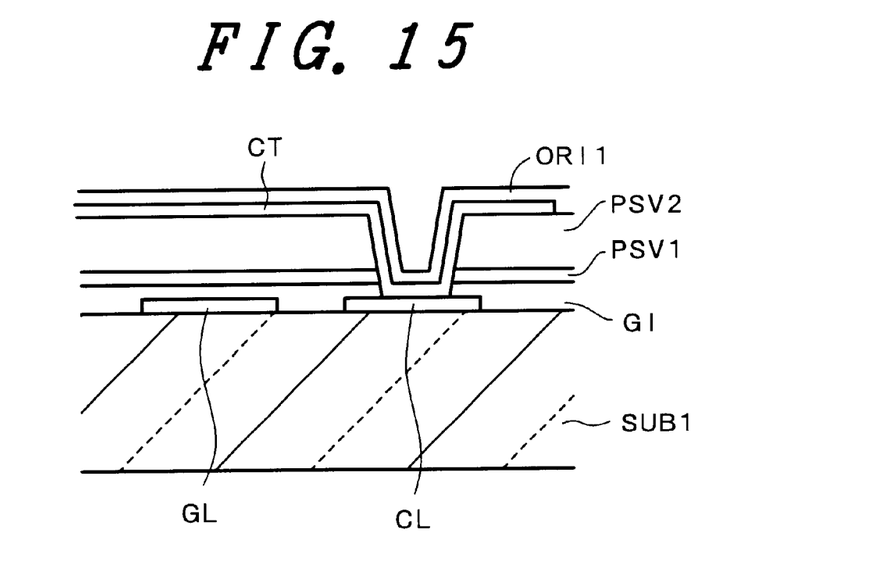
FIG. 15 is a sectional diagram along line XV—XV of FIG. 9.

FIG. 9 is a plan view diagram showing a still another embodiment of the liquid crystal display device in accordance with this invention, which becomes a diagram corresponding to FIG. 1. Additionally FIG. 10 is a sectional diagram along line X—X of FIG. 9 whereas FIG. 15 is a sectional diagram along line XV—XV of FIG. 9 (any arrangement on the transparent substrate SUB2 side is not depicted herein).

First, a different in arrangement from the case of FIG. 1 is that the protective film PSV is structured from a sequential lamination or multilayer body of a protective film PSV1 made of inorganic material such as for example SiN or the like and a protective film PSV2 made of organic material such as resin or else. The protective film PSV with such multilayer structure is capable of reducing the dielectricity of itself; thus, it is possible to suppress occurrence of after-images otherwise occurring due to electric fields as created between for example the pixel electrode PIX and counter electrode CT.

Figure 10:
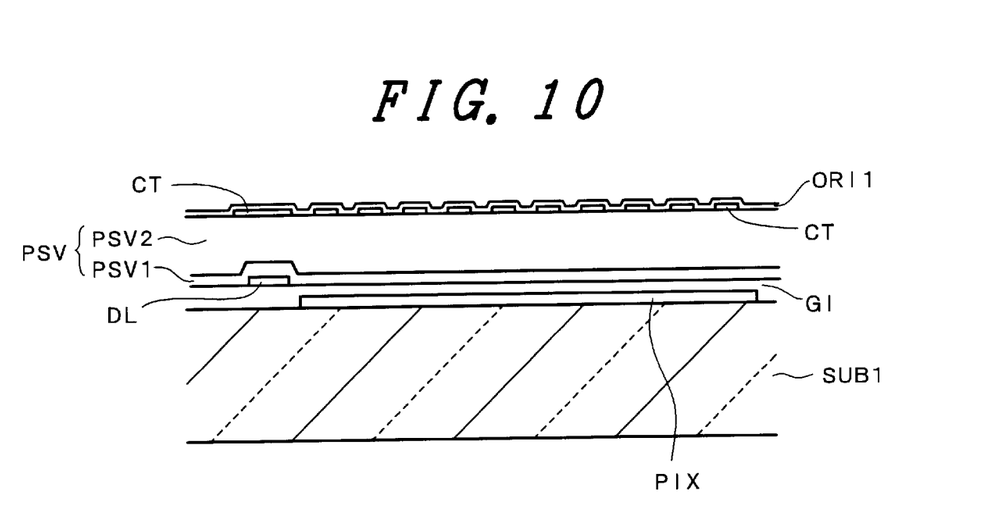
FIG. 10 is a sectional diagram along line X—X of FIG. 9.

It is also possible by letting part of the counter electrode CT overlap a drain signal line as shown in FIG. 10 to attempt to improve aperture ratios.

And the electrode that is formed on the upper surface of the protective film PSV (more accurately, the protective film PSV2) becomes a counter electrode CT which is formed for example of an ITO film or else and is electrically connected to the counter voltage signal line CL through a contact hole CH4 which was formed to go through the protective films PSV2 and PSV1 and insulating film GI.

It should be noted in this embodiment that the counter electrode CT is designed in such a manner as to let band-like electrodes linearly extending in they direction in the drawing be parallel-provided in the x direction in the drawing and be arranged as a pattern with specified ends on the lower side thereof being common-coupled together while causing them to be electrically connected with a counter voltage signal line CL through the contact hole CH4 at the common-coupled portion.

Due to this, the counter voltage signal line CL is formed so that it is adjacent to and neighbors upon the gate signal line GL.

The pixel electrode PIX is formed in the same layer as the counter voltage signal line CL while avoiding or "bypassing" the formation region of the counter voltage signal line CL, resulting in establishment of electrical connection with the source electrode SD2 of a thin-film transistor TFT as formed on the insulating film GI through a contact hole CH5 as formed to penetrate the protective films PSV2 and PSV1 and the insulating film GI and also a contact hole CH5' as formed to penetrate the protective films PSV2 and PSV1.

Even in this case also, a convexo-concave configuration due to the presence of counter electrodes CT is formed on the surface of the protective film PSV within the pixel region thereof; thus, it is possible by this convexo-concave configuration to successfully disperse or scatter reflection light from more than one pixel electrode PIX which acts as a reflective film.

Alternatively, it is also possible to arrange the counter electrode CT in such a manner as to be disposed while overlapping the counter voltage signal line CL and gate signal line GL as shown in FIG. 15. In this case, CT is electrically connected at the upper and lower plus right and left pixels so that the resultant CT voltage potential is stabilized, thereby making it possible to offer an effect as to reduction of the brightness or luminance gradient. Additionally, as it becomes the form that covers GL by CT residing above the neighboring CL and GL, it is possible to prevent leakage of GL potentials which become the maximum amplitude within the panel concerned, which in turn makes it possible to preclude generation of domains due to rounding invasion or "wraparound" of electric fields and further possible to achieve EMI reduction.

It is to be noted here that in the liquid crystal display device having a plurality of linear counter electrodes CT on the planar pixel electrode PIX, any one of the aperture ratio improvement effect obtainable due to provision of CT above DL and the leakage electric field reduction effect due to provision of CT above GL along with the EMI reduction effect and the luminance gradient suppression effect due to common power feed with CT designed into a matrix between neighboring pixels should not be limited to the reflection type only and may also be applied to the case where both the pixel electrode PIX and the counter electrode CT are transparent electrodes.

Embodiment 5

Figure 11:
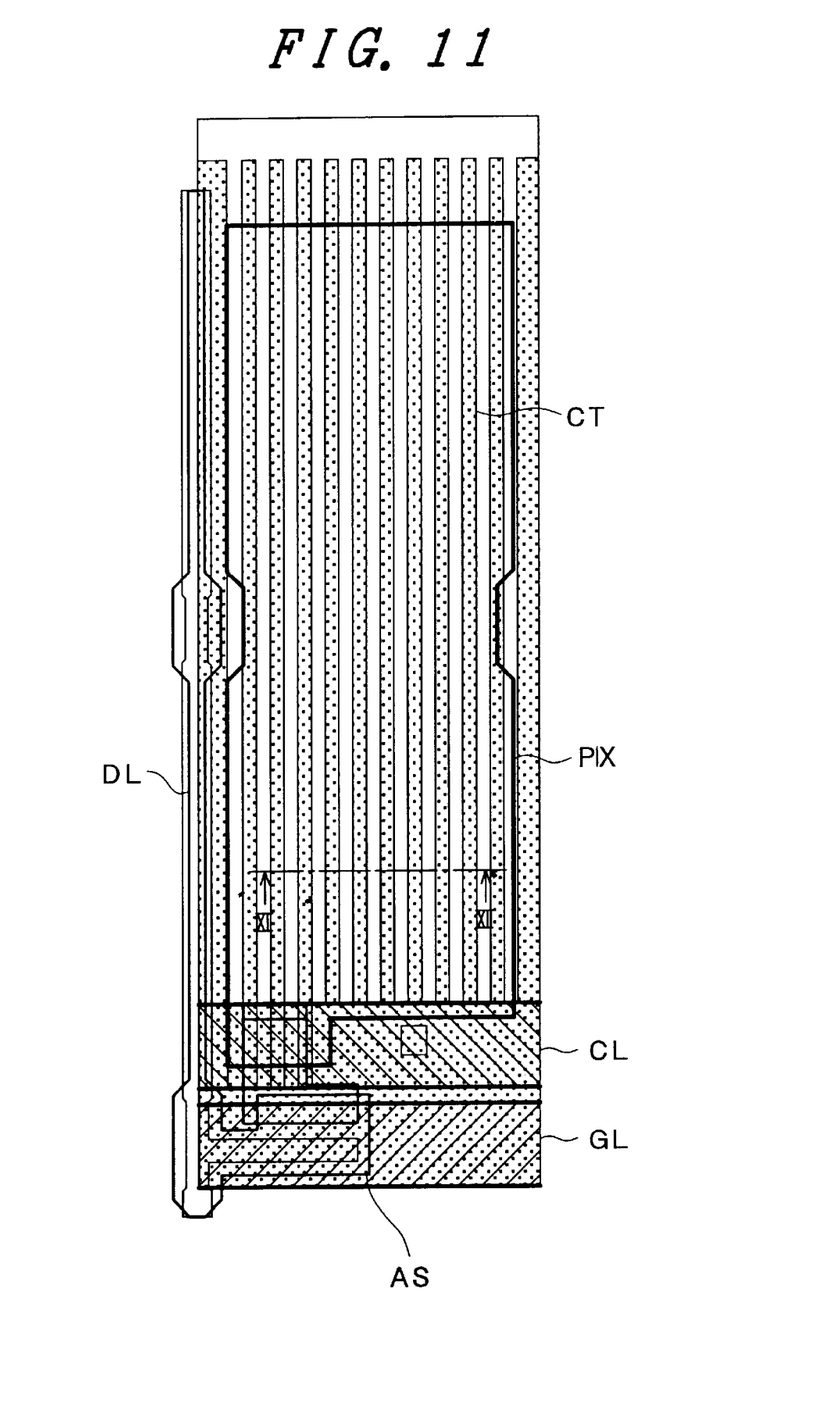
FIG. 11 is a plan view diagram showing a further embodiment of the pixel of the liquid crystal display device in accordance with the invention.
Figure 12:
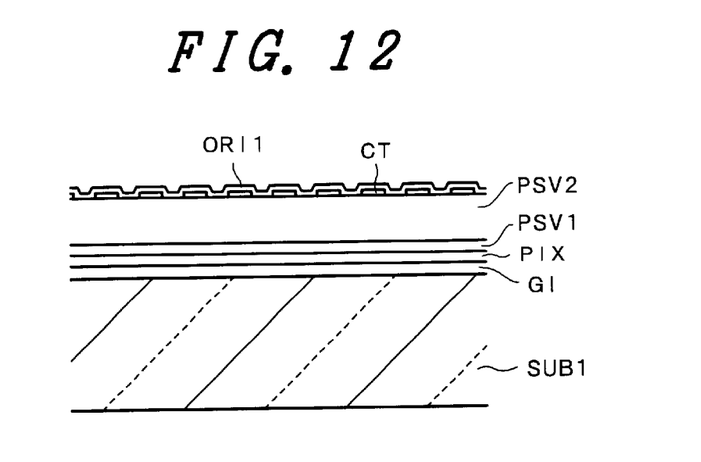
FIG. 12 is a sectional diagram along line XII—XII of FIG. 11.

FIG. 11 is a plan view diagram showing still another embodiment of the liquid crystal display device in accordance with the invention, which diagram is the one that corresponds to FIG. 9. In addition, FIG. 12 is a sectional diagram along line XII—XII of FIG. 11.

A difference in arrangement from the case of FIG. 9 is that the pixel electrode PIX for use as a reflective film is formed on the insulating film GI.

In this case, in view of the fact that the source electrode SD2 of a thin-film transistor TFT is formed at the upper face of the insulating film GI, the intended electrical connection can be established by forming them so that these overlap each other, which in turn makes it possible to perform without penetration of any contact holes.

Embodiment 6

Figure 13:
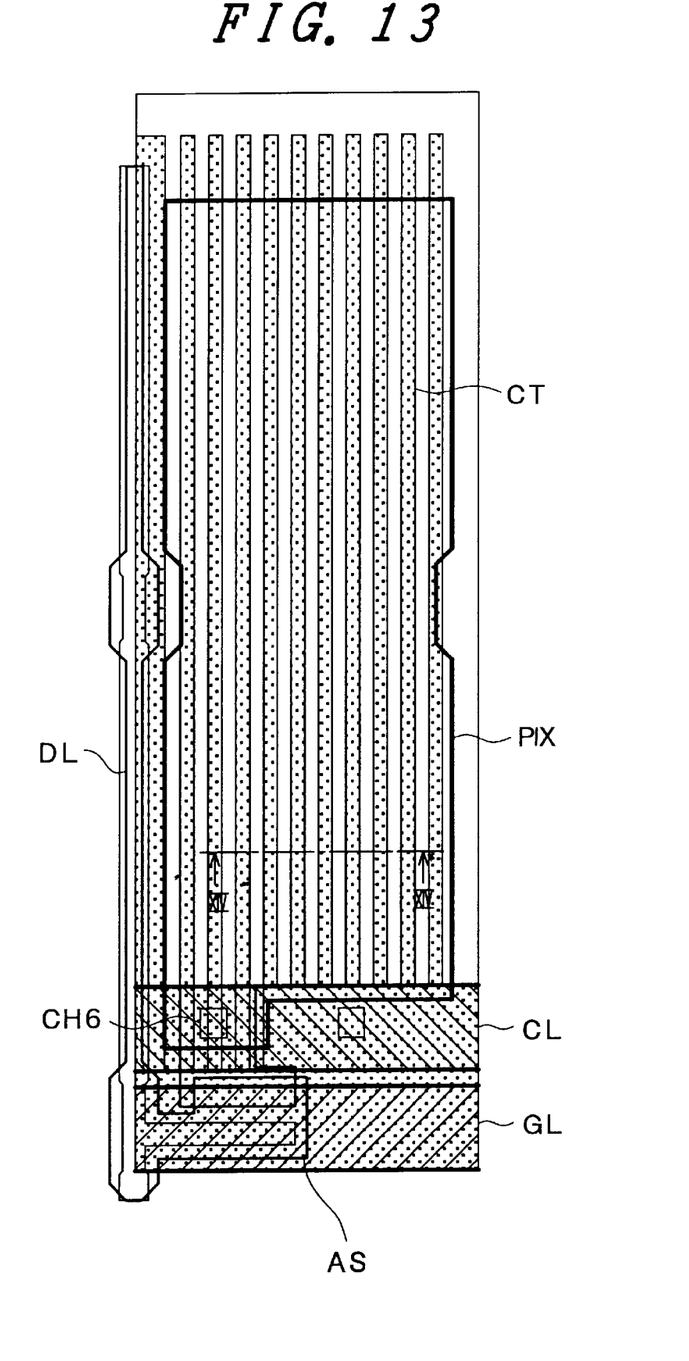
FIG. 13 is a plan view diagram showing another further embodiment of the pixel of the liquid crystal display device in accordance with the invention.
Figure 14:
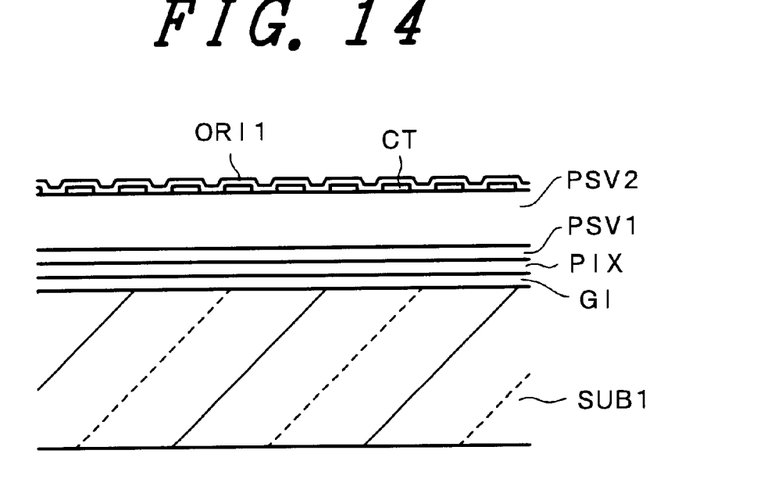
FIG. 14 is a sectional diagram along line XIV—XIV of FIG. 13.

FIG. 13 is a plan view diagram showing a further embodiment of the liquid crystal display device in accordance with the invention, which is the diagram that corresponds to FIG. 11. In addition, FIG. 14 is a sectional diagram at line XIV—XIV of FIG. 13.

A difference in arrangement from the case of FIG. 13 is that the pixel electrode PIX that is a reflective film is formed on a protective film PSV1 which is made of inorganic material.

In this case the pixel electrode PIX is arranged so that it is electrically connected to the source electrode SD2 of a thin-film transistor TFT at the upper surface of the insulating film GI through a contact hole CH6 as formed in the protective film PSV1.

Embodiment 7

A respective one of the above-described embodiments is such that in any one of them, a reflective film for permitting reflection of external incident rays of light is formed over the entire region of the pixel region.

However, it may also be designed so that the reflective film is formed in an about half region of the pixel region with a translucent material film (for example, an ITO film) being formed within the remaining about half region and electrically connected to this reflective film, wherein these are formed as pixel electrodes or counter electrodes. It is possible to obtain a liquid crystal display device of the so-called partial reflection type, which will be used as either the transmission type or the reflection type where necessary.

In this case the other electrode (counter electrode or pixel electrode) is arranged to have the pattern as in each embodiment described above, whereby it is possible to sufficiently disperse or scatter reflection light coming from the reflective film.

As apparent from the foregoing explanation, in accordance with the liquid crystal display device incorporating the principles of the invention, it is possible to obtain the one that is excellent in reliability for use as the reflection type, without employing any special arrangements.

What is claimed is:

1. A liquid crystal display device comprising:
   a pair of substrates with liquid crystals therebetween;
   a plurality of pixel regions provided between the liquid crystals and one of the substrates; and
   a first electrode, an insulating film and a second electrode stacked in order in each of said pixel regions,
   wherein the first electrode is plane-shaped with a pair of long sides and a pair of short sides, and the second electrode is formed with
   a first comb-shaped portion with a first strip formed in parallel with one of the long sides of the first electrode,
   a second comb-shaped portion with a second strip formed in parallel with another of the long sides of the first electrode, and
   a connecting portion formed generally in parallel with the short sides of the first electrode for connecting the first and the second comb-shaped portions.

2. A liquid crystal display device according to claim 1, wherein the second electrode is made of an optically translucent conductive material.

3. A liquid crystal display device according to claim 2, wherein said each pixel region is surrounded by a pair of mutually neighboring gate signal lines and a pair of mutually neighboring drain signal lines;

said each pixel region having a switching element operable in response to a scan signal from a gate signal line;

and either said first electrode or said second electrode is a pixel electrode receiving an image signal from a drain signal line via said switching element.

4. A liquid crystal display device according to claim 1, wherein the second electrode is a pixel electrode, and the insulating film is a gate insulating film of a thin-film transistor.

5. A liquid crystal display device according to claim 1, wherein the second electrode is a pixel electrode, and the insulating film has a multilayer structure composed of a gate insulating film of a thin-film transistor and a protective film covering the thin-film transistor.

6. A liquid crystal display device according to claim 1, wherein the second electrode is a pixel electrode, and the insulating film is a protective layer covering a thin film transistor.

7. A liquid crystal display device according to claim 1, wherein the second electrode is a pixel electrode, and the insulating film is a multilayer structure composed of a gate insulating film of a thin-film transistor, a first protective film made of an inorganic material covering said thin-film transistor, and a second protective film made of an organic material and formed on an upper surface of said first protective film.

8. A liquid crystal display device according to claim 1, wherein the second electrode is a counter electrode, and the insulating film is a multilayer structure composed of a first protective film made of an inorganic material covering a thin-film transistor and a second protective film made of an organic material and formed on an upper surface of this first protective film.

9. A liquid crystal display device according to claim 1, wherein the second electrode is a counter electrode, and the insulating film is a second protective film made of an organic material and formed on an upper surface of a first protective film made of an inorganic material covering a thin-film transistor.

10. A liquid crystal display device according to claim 8, further comprising a corresponding drain signal line formed in substantially parallel with the counter electrode in each of the pixel regions, and at least one of the pixel regions having the counter electrode therein overlaps the corresponding drain signal line and is formed wider than the dram signal line.

11. A liquid crystal display device according to claim 10, further comprising a gate signal line and a conductive layer formed in each of the pixel regions, wherein the conductive layer is formed at the same layer as the counter electrode and overlaps with the gate signal line.

12. A liquid crystal display device according to claim 11, wherein said conductive layer is equal to or greater in width than the gate signal line.

13. A liquid crystal display device comprising:

a pair of substrates with liquid crystals sandwiched therebetween;

a plurality of pixel regions provided between the liquid crystals and one of the substrates;

a plurality of gate signal lines and drain signal lines; and one electrode, an insulating film, and another electrode being formed within each of the pixel regions defined as a region surrounded by a pair of the gate signal lines and a pair of drain signal lines, wherein the one electrode is a flat plane-shaped pixel electrode corresponding to one respective pixel having a pair of long sides and a pair of short sides, the another electrode is a comb-shaped counter electrode with multiple teeth each shaped in a strap, at least a part of the another electrode overlaps one of said drain signal line pair, one tooth of the comb-shaped electrode formed above the drain signal line is wider than the other teeth of the comb-shaped electrode, and the one electrode is wider than the region where the other teeth of the comb-shaped electrode are formed.

14. A liquid crystal display device according to claim 13, wherein said another electrode overlaps one of said gate signal line pair.

15. A liquid crystal display device according to claim 14, further comprising a counter voltage signal line adjacent to said one of gate signal line pair, and said another electrode.

* * * * *